United States Patent
Nowak et al.

(10) Patent No.: US 7,225,539 B2
(45) Date of Patent: Jun. 5, 2007

(54) MANUFACTURING METHOD ESPECIALLY FOR INTEGRALLY BLADED ROTORS

(75) Inventors: Darek Nowak, Farmington, CT (US);
Ashok Patel, Rocky Hill, CT (US);
Ray Petraska, Vernon, CT (US)

(73) Assignee: MTU Aero Engines GmbH, Munich (DE)

( * ) Notice: Subject to any disclaimer, the term of this patent is extended or adjusted under 35 U.S.C. 154(b) by 415 days.

(21) Appl. No.: 10/687,938

(22) Filed: Oct. 20, 2003

(65) Prior Publication Data

US 2005/0025598 A1   Feb. 3, 2005

(30) Foreign Application Priority Data

Jul. 29, 2003 (EP) .................................. 03017126

(51) Int. Cl.
*B23P 15/02* (2006.01)
*B23P 13/02* (2006.01)

(52) U.S. Cl. .................. 29/889.23; 29/889.7; 29/23.51; 29/558; 409/132

(58) Field of Classification Search ............... 29/23.51, 29/889, 889.7, 889.23, DIG. 26, 557, 558, 29/889.721; 409/132, 131, 143, 192, 203
See application file for complete search history.

(56) References Cited

U.S. PATENT DOCUMENTS 3,811,163 A * 5/1974 Frederick et al. ............. 407/11

6,077,002 A * 6/2000 Lowe .......................... 409/132

FOREIGN PATENT DOCUMENTS

GB       584282       8/1945

OTHER PUBLICATIONS

European Search Report (Dec. 19, 2003).

* cited by examiner

*Primary Examiner*—David P. Bryant
*Assistant Examiner*—Christopher M. Koehler
(74) *Attorney, Agent, or Firm*—Crowell & Moring LLP

(57) ABSTRACT

A method for the manufacture of components composed of difficult-to-cut materials for gas turbines, in particular for manufacturing integrally bladed rotors for gas turbine aircraft engines, by producing recesses with one or more side walls, the recesses forming flow channels and the side walls forming blade surfaces, whereby material in the region of the flow channels is removed by a drilling process, and after the drilling process is finished the remaining material in the region of said flow channels is removed by a milling process. The unique combination of a drilling process followed by a milling process completing the material removal reduces significantly the manufacturing time.

11 Claims, 6 Drawing Sheets

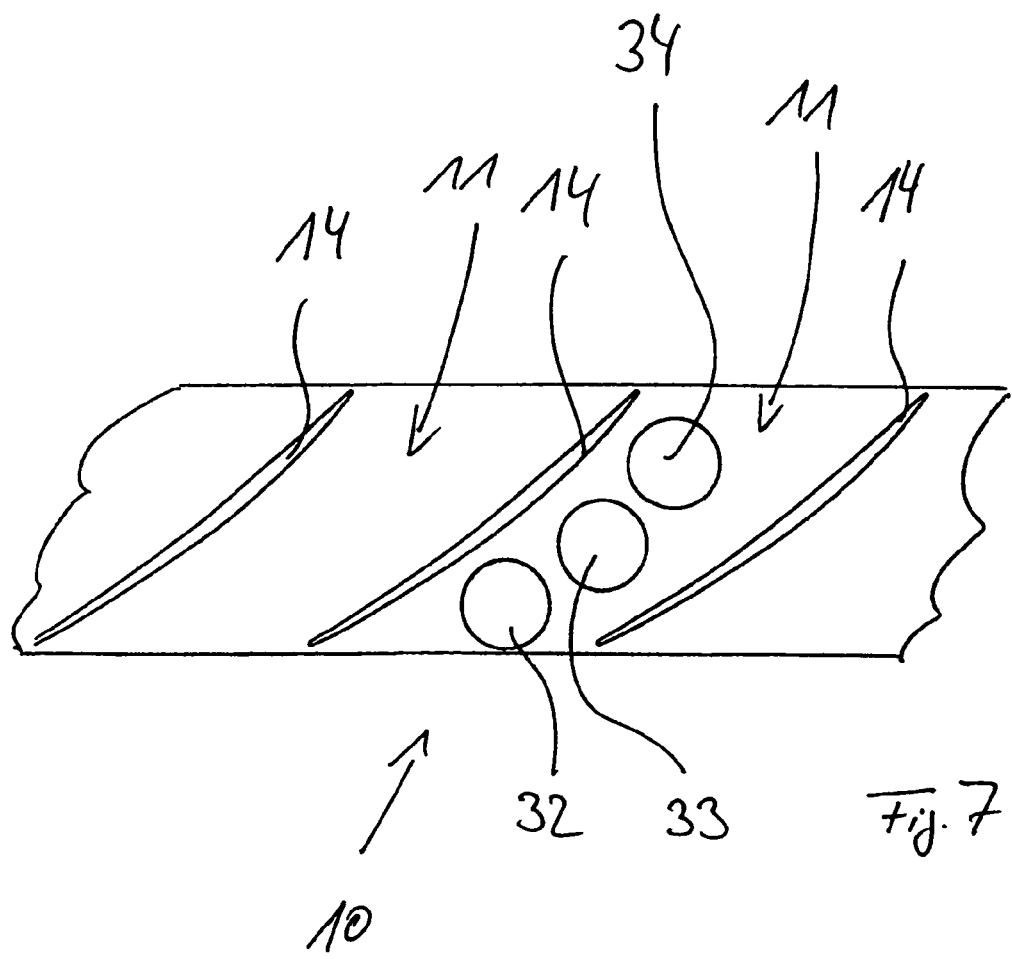

US 7,225,539 B2

MANUFACTURING METHOD ESPECIALLY FOR INTEGRALLY BLADED ROTORS

This application claims the priority of European patent application 03 017 126.8, filed Jul. 29, 2003, the disclosure of which is expressly incorporated by reference herein.

FIELD OF THE INVENTION

The present invention relates to a method for the manufacture of components composed of difficult-to-cut materials for gas turbines, especially for aircrafts engines, by producing recesses with one or more side walls, in particular for manufacturing integrally bladed rotors for gas turbines, the recesses forming flow channels and the side walls forming blade surfaces.

BACKGROUND AND PRIOR ART

Integrally bladed rotors for gas turbines are often called "blisks" or "blings", depending on the cross-sectional shape of the rotor. A disk-shaped rotor having integrated blades is called "blisk" (bladed disk), a ring-shaped rotor having integrated blades is called "bling" (bladed ring).

Several methods for the manufacture of integrally bladed rotors are known from the prior art. These methods include milling methods as well as chemical or electrochemical discharge methods to remove material from between the side walls defining the flow channels. E.g. a milling method for the manufacture of integrally bladed rotors is disclosed in the U.S. Pat. No. 6,077,002. All manufacturing methods known from the prior art are time consuming and result in an expensive manufacturing of integrally bladed rotors.

It is an object of the present invention to provide a method for the manufacture of especially integrally bladed rotors which allows to significantly reduce the material removal time.

SUMMARY OF THE INVENTION

The present invention provides a method for the manufacture of components composed of difficult-to-cut materials for gas turbines, especially for aircrafts engines, by producing recesses with one or more side walls, in particular for manufacturing integrally bladed rotors for gas turbines, the recesses forming flow channels and the side walls forming blade surfaces, whereby contours of said recesses are defined by defining contours of said side-walls and/or contours of said flow channels, whereby material in the region of said flow channels is removed by a drilling process, and whereby after the drilling process is finished the removal of material in the region of said flow channels is completed by a milling process. The unique combination of a drilling process followed by a milling process completing the material removal reduces significantly the manufacturing time and results in a less expensive manufacturing of integrally bladed rotors.

In accordance with a preferred embodiment of the present invention the drilling process is performed in a way that a drilling tool removes material in a flow wise direction of each flow channel, whereby the axis of the drill-holes is approximately in parallel to the flow direction through the flow channel to be manufactured. For each flow channel at least one center line of the flow channel will be calculated from the contours of the side-walls defining said flow channel. The drilling process is performed in a way that the axis of each drill-hole is approximately in parallel to the or each center line of the flow channel to be manufactured, whereby an intake-opening of each drill-hole is located adjacent to the leading-edges of the side-walls defining the flow channel to be manufactured, and whereby the outlet-opening of each drill-hole is located adjacent to the trailing-edges of the side-walls defining the flow channel to be manufactured.

In accordance with an alternative preferred embodiment of the present invention the drilling process is performed in a way that a drilling tool removes material in an across flow direction of each flow channel, whereby the axis of the drill-holes is approximately perpendicular to the flow direction through the flow channel to be manufactured. The drilling tool removes material by drilling pocket-like drill-holes starting from the outside diameter of the rotor in a radial direction towards a platform of said rotor.

For both above-mentioned preferred embodiments, after the drilling process is finished the removal of material in the region of said flow channels is completed by a milling process, whereby a milling tool removes the material remaining after the drilling process in the region of said flow channels.

Other objects, advantages and novel features of the present invention will become apparent from the following detailed description of the invention when considered in conjunction with the accompanying drawings

BRIEF DESCRIPTION OF THE DRAWINGS

FIG. 7: shows a second alternative to the second step of the manufacturing method illustrated in FIG. 4 according to another embodiment of the invention.

DETAILED DESCRIPTION

Figure 1:
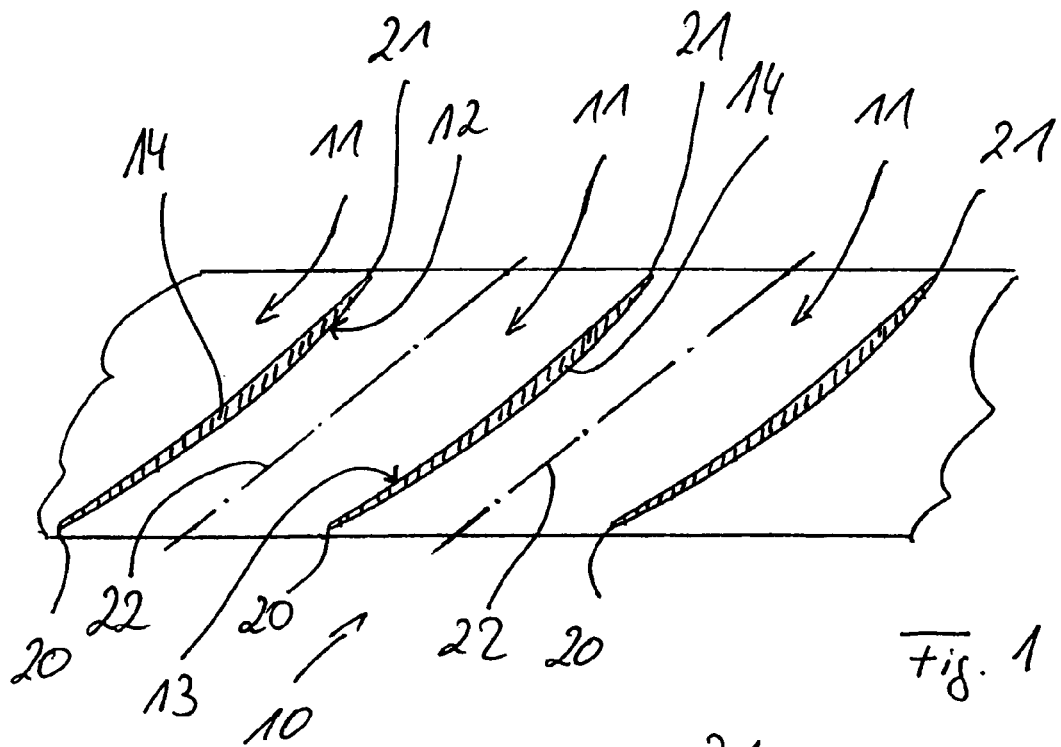
FIG. 1: is a radial view of an integrally bladed rotor showing three blades in a cross-section in a first radial height.
Figure 2:
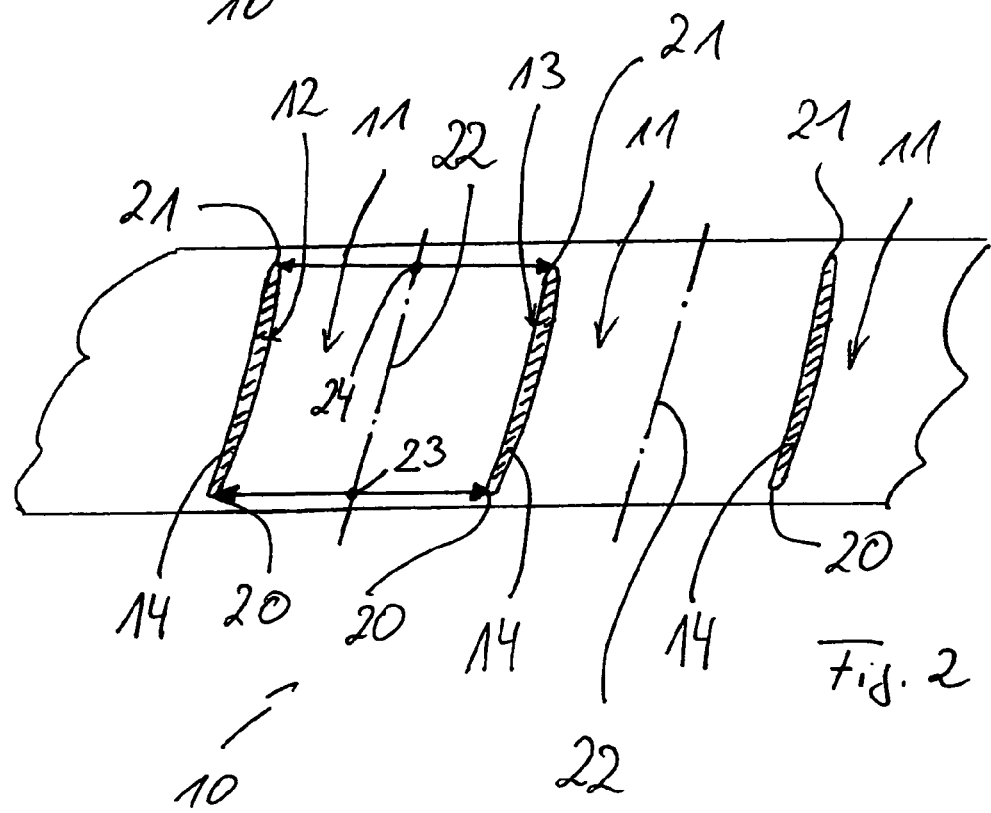
FIG. 2: is a radial view of the integrally bladed rotor according to FIG. 1 showing the three blades in a cross-section in a second radial height.

FIGS. 1 and 2 show the radial view of a component to be manufactured, here by way of example, in form of an integrally bladed rotor 10 for a gas turbine. The present invention relates to a unique method for the manufacturing of such an integrally bladed rotor 10 composed of difficult-to-cut materials like nickel alloys or titanium alloys. Such integrally bladed rotors 10 are manufactured by producing recesses 11 between two opposite side-walls 12, 13, whereby the two opposite side-walls 12, 13 are part of two adjacent blades 14. The side-walls 12, 13 form blade surfaces and the recesses 11 form flow channels located between the individual blades 14.

FIGS. 1 and 2 show the blades 14 in a cross-sectional view, whereby the radial heights of the cross-sections differ from each other. For that, it can be taken from FIGS. 1 and 2 that the contours of the side-walls 12 and 13 are a function of the radial position within said side-walls 12, 13.

In accordance with the present invention, the recesses 11 between the blades 14 are produced by removing material in the region of said recesses 11 or said flow channels by a drilling process, whereby after the drilling process is finished, the removal of the material in the region of said recesses 11 or flow channels is completed by a milling process. According to the invention, the removal of the material in the region of the channels 11 is a combination of a drilling process and a milling process, whereby the milling process takes place after the drilling process is finished.

A first preferred embodiment of the method according to the present invention will now be described in greater detail with reference to FIGS. 1 to 5. According to this first preferred embodiment of the invention, the drilling process is performed in a way that the material is removed in a flow wise direction of each flow channel or recess 11.

Figure 3:
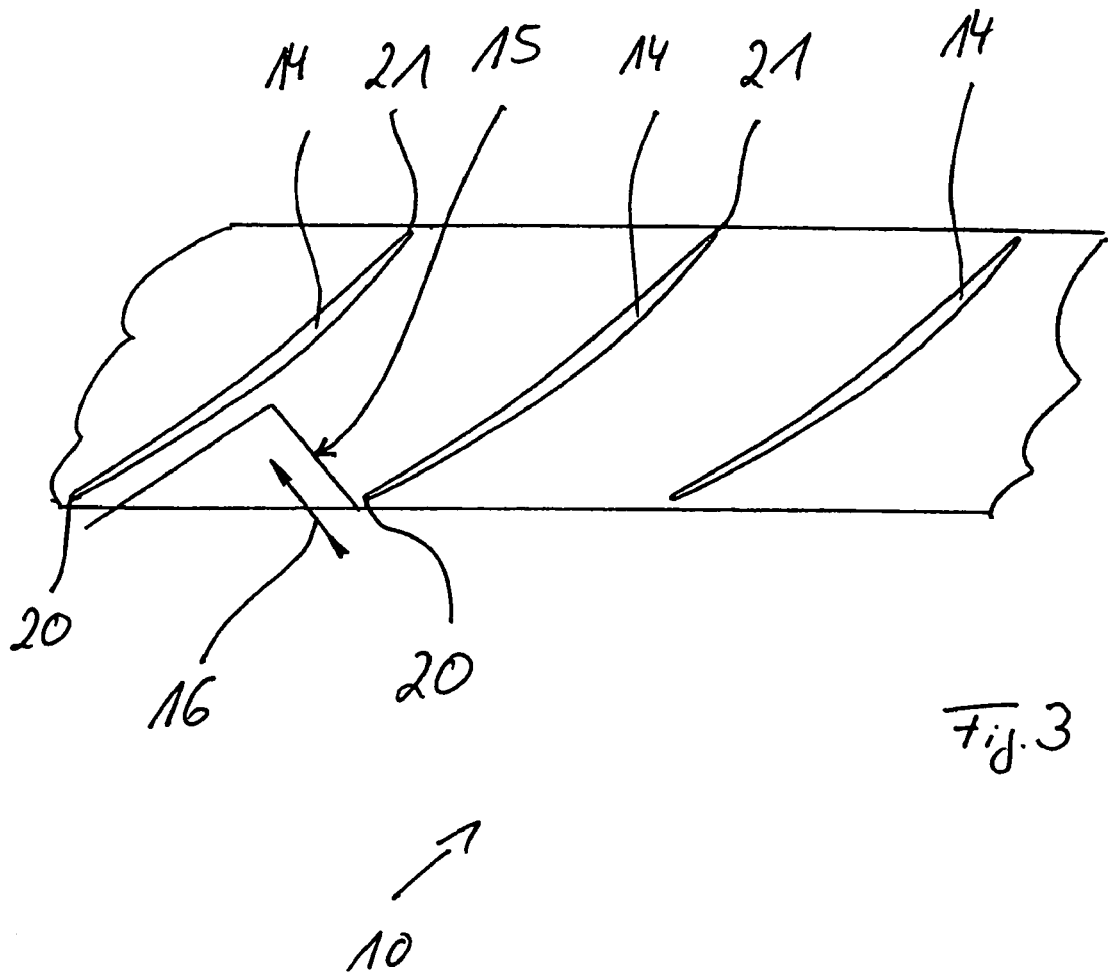
FIG. 3: is a radial view of the integrally bladed rotor according to FIG. 1 illustrating a first step of the manufacturing method according to a first embodiment of the invention.

Prior to the drilling process in flow wise direction, a surface 15 perpendicular to the drilling direction is produced by removing material on one side of the rotor 10 as indicated by the arrow 16 in FIG. 3. The surface 15 perpendicular to the direction of the drilling process provides a good drilling quality and a reliable drilling process.

Figure 4:
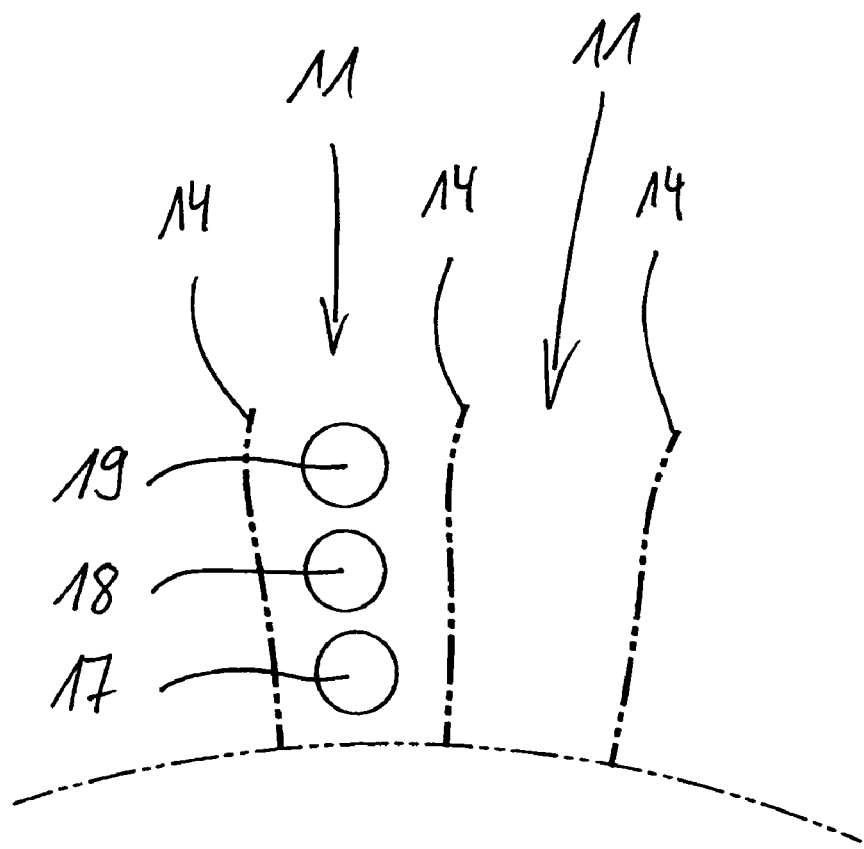
FIG. 4: is an axial view of the integrally bladed rotor according to FIGS. 1 and 3 illustrating a second step of the manufacturing method according to the first embodiment of the invention.

After the surface 15 has been produced, a drilling tool (not shown) removes material by drilling drill-holes 17, 18 and 19 into the material (see FIG. 4). The drilling of the drill-holes 17, 18 and 19 is started at the surface 15, which is located in the region of the leading-edges 20 of the side-walls 12 and 13 defining the flow channel to be manufactured, whereby the drilling of the drill-holes 17, 18 and 19 continues in the flow wise direction of the flow channel to be manufactured and is determined in the region of the trailing-edges 21 of said side-walls 12, 13.

In order to determine the drilling-direction for the drilling process or the axis of each drill-hole 17, 18 and 19 at least one center line for each recess 11 or flow channel will be calculated from the contours of the opposite side-walls 12, 13 defining the recess or flow channel to be manufactured. The center lines 22 calculated from the contours of the side-walls 12, 13 are shown in FIGS. 1 and 2. These center lines 22 are defined by two points 23 and 24, whereby the first point 23 is defined by the half distance between the leading-edges 20 of the side-walls 12, 13, and whereby the second point 24 is defined by the half distance between the trailing-edges 21 of said side-walls 12, 13. This is shown in FIG. 2. These two points 23 and 24 define exactly the direction of the center lines 22, whereby the direction of the center lines 22 is a function of the radial position or radial height within the side-walls 12, 13.

Starting in the region of the leading-edges 20 of the opposite side-walls 12 and 13, an intake opening of the drill-hole 17, 18 or 19 will be drilled, the drilling process will be continued in the direction of the corresponding center line 22 defining the axis of the drill-hole 17, 18 or 19, and in the region of the trailing-edges 21 of the opposite side-walls 12, 13 an outlet opening of the drill-hole 17, 18 or 19 will be drilled.

Figure 6:
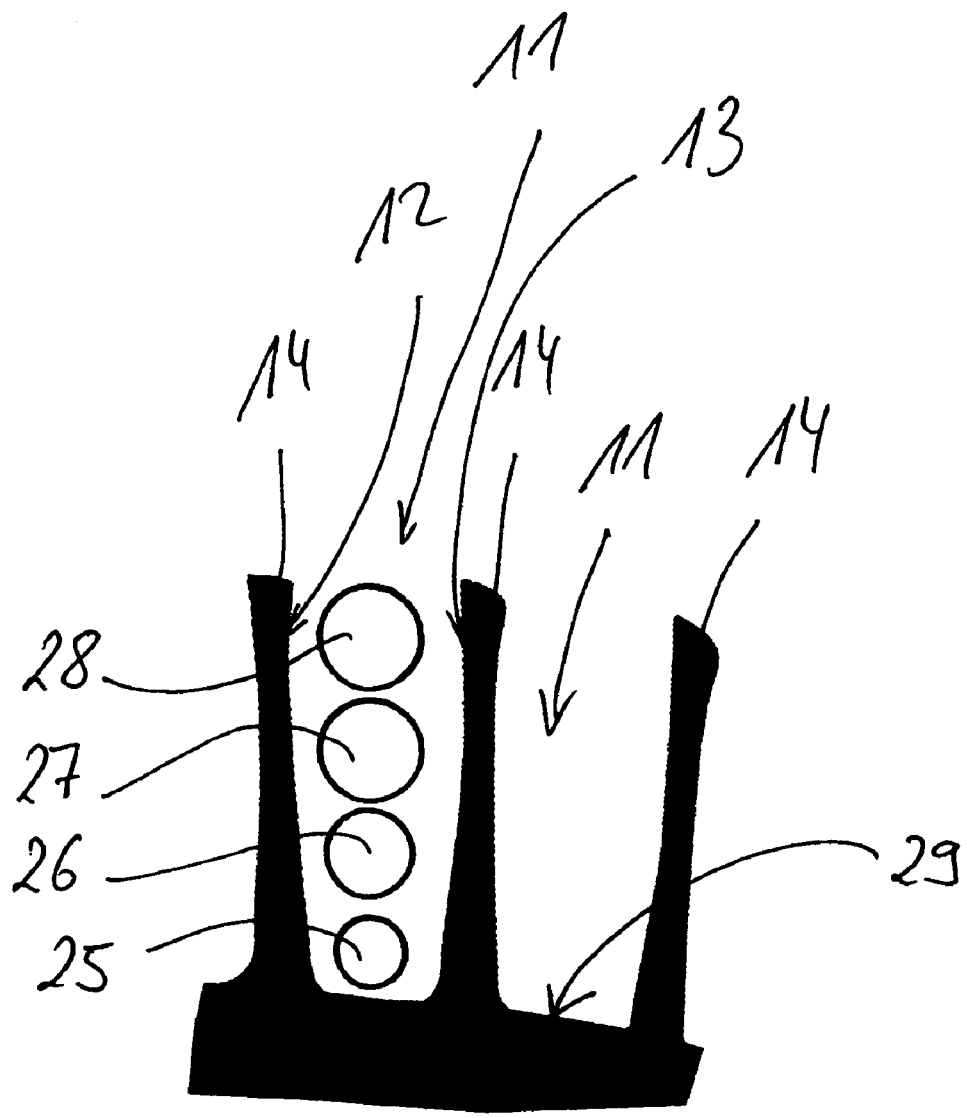
FIG. 6: shows a first alternative to the second step of the manufacturing method illustrated in FIG. 4 according to another embodiment of the invention.

As shown in FIG. 4, a plurality of drill-holes 17, 18 and 19 will be drilled in the region of one recess 11. The size of the drill-holes 17, 18 and 19, the pattern of the drill-holes 17, 18 and 19, and the axis (angle) of the drill-holes 17, 18 and 19 depend on their radial height and is determined by the contours of the recesses 11 or the contours of the side-walls 12, 13 of the blades 14. In the drawing of FIG. 4 the cross-sectional size of the drill-holes 17, 18 and 19 is the same. However, as shown in FIG. 6, the cross-sectional size of the drill-holes can of course differ from each other. As shown in FIG. 6, four drill-holes 25, 26, 27 and 28 will be drilled between two opposite side-walls 12, 13 of two adjacent blades 14. The cross-sectional size of the drill-holes 25, 26, 27 and 28 is a function of the contour or shape of the side-walls 12, 13, whereby the shape is a function of the radial position within said side-walls 12, 13. The drill-hole 25 located adjacent to an inner surface 29 or platform of the rotor 10 comprises the smallest diameter because of the fact, that the side-walls 12, 13 have a smaller distance from each other in the region of said inner surface 29 than in regions with increasing radial distance from said inner surface 29.

Figure 5:
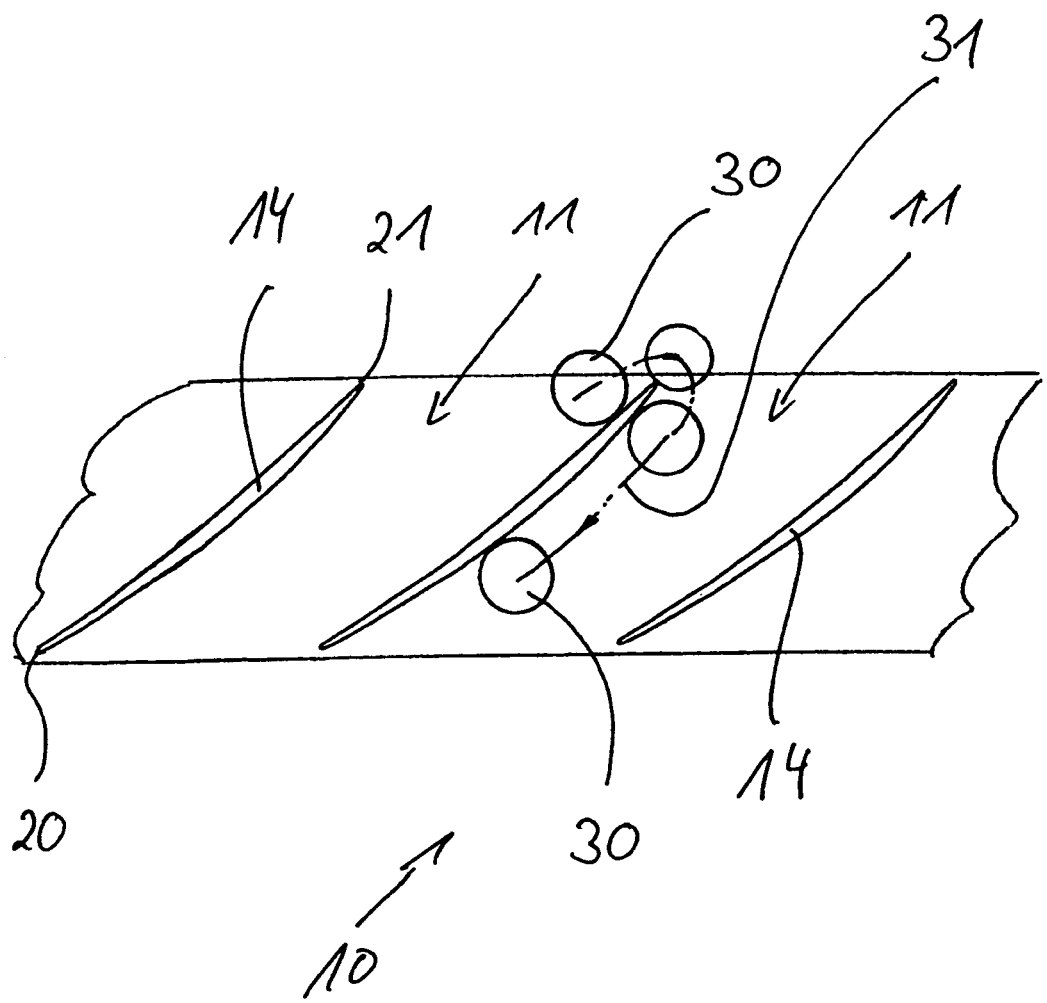
FIG. 5: is a radial view of the integrally bladed rotor according to FIGS. 1, 3 and 4 illustrating a third step of the manufacturing method according to the first embodiment of the invention.

After the drilling process by drilling drill-holes in a flow wise direction of each flow channel or recess 11 has been finished, the removal of the material in the region of said recesses 11 is completed by a milling process. This is shown in FIG. 5. FIG. 5 illustrates a milling tool 30 and the movement of said milling tool 30 by the line 31. The milling tool 31 is operated in a way, that the axis of the milling tool 30 is approximately oriented in radial direction of the rotor 10. Details of the milling process itself are known to the person skilled in the art.

The uniqueness of the manufacturing method as described above is the combination of a drilling process and a milling process. The milling process takes place after the drilling process has been finished. In connection with the drilling process, the size of the drill-holes and the pattern of the drill-holes and the axis of the drill-holes is determined from the contours defining the recesses to be manufactured. After these parameters of the drilling process have been determined, the drill-holes are drilled preferably in the flow wise direction for all recesses forming the flow channels. After the drill-holes have been drilled, a milling process will be performed to complete the removal of the materials.

In contrary to the method described above, it is also possible that the drilling process is performed in a way that a drilling tool removes material in an across flow direction of each flow channel. This is shown in FIG. 7. FIG. 7 shows a radial view of an integrally bladed rotor 10 with three drill-holes 32, 33 and 34 drilled into the material between two adjacent blades 14. The axis of the drill-holes 32, 33 and 34 is approximately in radial direction of the rotor meaning that the axis of the drill-holes 32, 33 and 34 is approximately perpendicular to the flow direction through the flow channels or recesses 11 to be manufactured. A drilling tool removes material by drilling pocket-like drill-holes 32, 33 and 34 starting from the outside diameter of the rotor in a radial direction towards the platform or inner surface of said rotor. The remaining process is the same as described above in connection with the first preferred embodiment of the invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Method for the manufacture of components composed of difficult-to-cut materials for gas turbines, especially for aircraft engines. by producing recesses with one or more side walls, in particular for manufacturing integrally bladed rotors for gas turbines, the recesses forming flow channels and the side walls forming blade surfaces, comprising the following steps:

a) defining contours of said recesses by defining contours of at least one of said side-walls and said flow channels,
   b) removing material in the region of said flow channels by a drilling process,
   c) after the drilling process is finished, completing the removal of material in the region of said flow channels by a milling process,
   wherein the drilling process is performed in a way that a drilling tool removes material by drilling drill-holes in a flow wise direction of each flow channel, at least one of the size of the drill-holes, the pattern of the drill-holes and the axis of the drill-holes is determined from the defined contours of said recesses, and the axis of the drill-holes is approximately in parallel to the flow direction through the flow channel to be manufactured.

2. Method according to claim 1, wherein the drilling process is started in a region of a leading-edge of the side-walls defining each flow channel, continues in the flow wise direction of each flow channel, and terminates in a region of a trailing-edge of each side-walls.

3. Method according to claim 1, wherein prior to the drilling process in flow wise direction a surface perpendicular to the drilling direction is produced.

4. Method for the manufacture of components composed of difficult-to-cut materials for gas turbines, especially for aircraft engines, by producing recesses with one or more side walls, in particular for manufacturing integrally bladed rotors for gas turbines, the recesses forming flow channels and the side walls forming blade surfaces, comprising the following steps:

a) defining contours of said recesses by defining contours of at least one of said side-walls and said flow channels,
   b) removing material in the region of said flow channels by a drilling process,
   c) after the drilling process is finished, completing the removal of material in the region of said flow channels by a milling process,
   wherein for each flow channel at least one center line of the flow channel will be calculated from the contours of the side-walls defining said flow channel, and
   wherein the drilling process is performed in a way that a drilling tool removes material by drilling drill-holes, at least one of the size of the drill-holes, the pattern of the drill-holes and the axis of the drill-holes is determined from the defined contours of said recesses, and the axis of each drill-hole is approximately in parallel to the or each center line of the flow channel to be manufactured, whereby an intake-opening of each drill-hole is located adjacent to a leading-edge of the side-walls defining the flow channel to be manufactured, and whereby the outlet-opening of each drill-hole is located adjacent to a trailing-edge of the side-walls defining the flow channel to be manufactured.

5. Method according to claim 4, wherein for each flow-channel a plurality of center lines are calculated, the direction of the center lines is a function of contours of the side-walls defining said flow channel, and the contours of the side-walls is a function of a radial position within said side-walls.

6. A method for manufacturing integrally-bladed rotors for gas turbines, comprising the steps of:

defining the contours of a plurality of flow channel recesses in the integrally-bladed rotor, wherein each recess includes side walls forming blade surfaces;
   removing a first portion of material in the flow channels by a drilling process; and
   removing a remaining portion of material in the flow channels corresponding to the contours of the recesses by a milling process
   wherein
   the drilling process is performed by a drilling tool that removes material by drilling drill-holes,
   at least one of the size of the drill-holes, the pattern of the drill-holes and the axis of the drill-holes is determined from the contours of the recesses, and
   the axis of the drill-holes is approximately parallel to a flow direction of each flow channel.

7. The method of claim 6, wherein the drilling process is started in a region of a leading edge of the side-walls of each recess, continues in the flow direction of each flow channel, and terminates in a region of a trailing edge of each recess.

8. The method of claim 6, further comprising, prior to the step of removing a first portion of material in the flow channels in flow wise direction by a drilling process, the step of:

producing a surface perpendicular to the drilling direction.

9. The method of claim 6, wherein
   the milling process is performed by a milling tool which removes the remaining portion of material in the flow channels corresponding to the contours of the recesses.

10. A method for manufacturing integrally-bladed rotors for gas turbines, comprising the steps of:

defining the contours of a plurality of flow channel recesses in the integrally-bladed rotor, wherein each recess includes side walls forming blade surfaces;
   removing a first portion of material in the flow channels by a drilling process; and
   removing a remaining portion of material in the flow channels corresponding to the contours of the recesses by a milling process
   wherein
   the drilling process is performed by a drilling tool that removes material by drilling drill-holes,
   at least one of the size of the drill-holes, the pattern of the drill-holes and the axis of the drill-holes is determined from the contours of the recesses,
   for each flow channel at least one center line of the flow channel is calculated from the contours of the side-walls of the recess defining the flow channel,
   an axis of each drill-hole is approximately parallel to at least one of the at least one center line of the flow channel,
   an intake-opening of each drill-hole is located adjacent to a leading edge of one of the side-walls defining the flow channel, and
   an outlet-opening of each drill-hole is located adjacent to a trailing edge of one of the side-walls defining the flow channel.

11. The method of claim 10, wherein
   a plurality of center lines within each flow-channel are calculated from the contours of the side-walls defining the flow channels, and
   the direction of each of the plurality of centerlines is a function of a radial position of each centerline.

* * * * *